United States Patent
Meyer et al.

(10) Patent No.: US 9,765,881 B2
(45) Date of Patent: Sep. 19, 2017

(54) HYDRAULIC CIRCUIT FOR POWERTRAIN HAVING OTG

(71) Applicant: Caterpillar Inc., Peoria, IL (US)

(72) Inventors: Scott Patrick Meyer, Washington, IL (US); David Michael Thaler, Metamora, IL (US); Kendall Robert Harrell, Peoria, IL (US); Scott Alan Lyons, Peoria, IL (US); James David Hill, Brimfield, VA (US)

(73) Assignee: Caterpillar Inc., Peoria, IL (US)

( * ) Notice: Subject to any disclaimer, the term of this patent is extended or adjusted under 35 U.S.C. 154(b) by 104 days.

(21) Appl. No.: 14/634,482

(22) Filed: Feb. 27, 2015

(65) Prior Publication Data

US 2016/0250923 A1   Sep. 1, 2016

(51) Int. Cl.
| | |
|---|---|
| *B60K 17/356* | (2006.01) |
| *F16H 57/04* | (2010.01) |
| *F16H 61/02* | (2006.01) |
| *F16H 61/00* | (2006.01) |
| *B60K 17/35* | (2006.01) |

(52) U.S. Cl.
CPC ..... *F16H 61/0265* (2013.01); *F16H 57/0412* (2013.01); *F16H 57/0446* (2013.01); *F16H 61/0031* (2013.01); *B60K 17/35* (2013.01); *F16H 2061/0037* (2013.01)

(58) Field of Classification Search
CPC .............. B60K 17/356; F16H 57/0412; F16H 57/0446; F16H 61/0031; F16H 61/0265; F16H 2061/0037
USPC ........................................................ 180/242
See application file for complete search history.

(56) References Cited

U.S. PATENT DOCUMENTS

| 3,800,913 A * | 4/1974 | Schmitt ................... F01M 1/12 |
| | | 184/6.13 |
| 3,899,938 A | 8/1975 | Crabb |
| 5,078,660 A | 1/1992 | Williams et al. |
| 5,655,986 A | 8/1997 | Wilson et al. |
| 5,853,342 A | 12/1998 | Pritchard et al. |
| 5,890,986 A | 4/1999 | Pritchard et al. |
| 6,582,331 B1 | 6/2003 | Baxter, Jr. |

(Continued)

FOREIGN PATENT DOCUMENTS

| EP | 0890041 | 7/2003 |
| WO | WO 2013/143809 | 10/2013 |

OTHER PUBLICATIONS

Brochure entitled "Volvo Articulated Haulers A25F, A30F", www.volvoce.com/na, Ref. No. VOE22A1006560 Copyright © 2011, pp. 1-24.

(Continued)

*Primary Examiner* — Jacob Knutson
(74) *Attorney, Agent, or Firm* — Finnegan, Henderson, Farabow, Garrett & Dunner, LLP; Jeffrey A. Greene

(57) ABSTRACT

A hydraulic circuit is disclosed for use with a powertrain having an engine, a transmission, and an output transfer group. The hydraulic circuit may have a first sump configured to collect fluid drained from the transmission, and a second sump configured to collect fluid drained from the output transfer group. The hydraulic circuit may also have a primary pump configured to draw fluid from the first sump and generate at least one flow of pressurized fluid directed to the transmission and to the output transfer group.

19 Claims, 6 Drawing Sheets

(56) References Cited

U.S. PATENT DOCUMENTS

| | | | |
|---|---|---|---|
| 7,318,511 | B2 | 1/2008 | Grogg |
| 7,743,888 | B2 | 6/2010 | Allen et al. |
| 8,056,442 | B2 | 11/2011 | Ruehle et al. |
| 8,365,637 | B2 | 2/2013 | Herold et al. |
| 8,647,225 | B2 | 2/2014 | Thomas et al. |
| 2005/0277509 | A1* | 12/2005 | Showalter .......... B60K 17/3467 475/210 |
| 2008/0029327 | A1* | 2/2008 | Carlson ............... F16H 61/4035 180/242 |
| 2008/0296123 | A1 | 12/2008 | Vu et al. |
| 2009/0143182 | A1* | 6/2009 | Thomas .............. F16H 57/0483 475/159 |
| 2014/0260229 | A1* | 9/2014 | Long ....................... F16H 61/42 60/327 |

OTHER PUBLICATIONS

Brochure entitled "Volvo Articulated Haulers A35F, A40F", www.volvoce.com/na, Ref. No. VOE22A1006561 Copyright © 2011, pp. 1-23.
Brochure entitled "D-series MkVII Articulated Dump Trucks", www.bellequipment.com, pp. 1-28.
http://www.team-bhp.com/forum/technical-stuff/13453-gypsy-4wd-help-wanted.html.
www.stealth316.com/2-awd3.htm#cdvcu.
http://www.wjjeeps.com/nv242_1.jpg.
http://www.mhaftermarket.com/pdfs/service/MVG-2000%20and%202001_service.pdf.
http://www.zf.com/na/content/en/united_states/corporate_us/products_services/service_portolio/construction_machine_service_folder_us/construction_transmissions_folder_us/construction_transmissions_us.html.
http://us.bellequipment.com/apps/bell/bellnorthamerica.nsf/0/4CC52FA0255D26D842257AAD00232531/$file/4206D_Mk6.pdf.
http://us.bellequipment.com/en/product/4206d#autolocation.
http://us.bellequipment.com/apps/bell/bellnorthamerica.nsf/0/9305D29FCA08EE018025799F0077DC50/$file/technical_data.pdf.
U.S. Patent Application entitled "Output Transfer Troup for Mobile Machine Powertrian" by David Michael Thaler et al., filed Feb. 27, 2015.
U.S. Patent Application entitled "Output Transfer Troup for Mobile Machine Powertrain" by David Michael Thaler, filed Feb. 27, 2015.

* cited by examiner

US 9,765,881 B2

HYDRAULIC CIRCUIT FOR POWERTRAIN HAVING OTG

TECHNICAL FIELD

The present disclosure relates generally to a hydraulic circuit and, more particularly, to a hydraulic circuit for powertrain having an output transfer group (OTG).

BACKGROUND

Machines, such as haul trucks and wheel loaders, each include a powertrain that provides torque to wheels of the machines. The powertrain generally consists of a combustion engine, a powershift transmission connected to an output of the engine, and an output transfer group (a.k.a., a drop box) that selectively delivers power from the transmission to front and rear axles of the machine.

An exemplary output transfer group is disclosed in U.S. Pat. No. 8,365,637 that issued to Herold et al. on Feb. 5, 2013 (the '637 patent). Specifically, the '637 patent discloses an output transfer group having a housing with a single input port and three output couplers. Two of the output couplers are used to drive axles of a mobile machine, and one output coupler is used to power a draw-works assembly mounted to the machine. An output shaft of a transmission is received within the input port, and a front axle coupler is located below the input port. The draw works coupler and a rear axle coupler extend from an opposite side of the housing. A hydraulic circuit having a dedicated filter is provided for connection of the couplers to a source of lubricant. The output transfer group also includes a gear train that selectively connects the output shaft of the transmission to each of the different couplers by way of a coupling mechanism. The gear train includes an input gear connected to the transmission output shaft by way of the input port, an output gear connectable to the front and rear axle couplers, and a transfer gear that extends between the input and output gears.

Although the output transfer group of the '637 patent may be suitable for some applications, it may be less than optimal, For example, the output transfer group, having its own hydraulic circuit, may be large, complex, and expensive.

The disclosed hydraulic circuit is directed to overcoming one or more of the problems set forth above and/or other problems of the prior art.

SUMMARY

In one aspect, the present disclosure is directed to a hydraulic circuit for a powertrain having an engine, a transmission, and an output transfer group. The hydraulic circuit may include a first sump configured to collect fluid drained from the transmission, and a second sump configured to collect fluid drained from the output transfer group. The hydraulic circuit may also include a primary pump configured to draw fluid from the first sump and generate at least one flow of pressurized fluid directed to the transmission and to the output transfer group.

In another aspect, the present disclosure is directed to a method of lubricating a power system having an engine, a transmission, and an output transfer group. The method may include collecting fluid from the transmission, and collecting fluid from the output transfer group. The method may also include pressurizing the fluid collected from the transmission, and directing at least one flow of the pressurized fluid to the transmission and to the output transfer group In another aspect, the present disclosure is directed to a mobile machine. The mobile machine may include a frame, a front axle rotatably supporting a front end of the frame, and tandem rear axles rotatably supporting a rear end of the frame. The mobile machine may also include an engine, a transmission connected to the engine, and an output transfer group operatively connecting the transmission to the front and tandem rear axles. The mobile machine may further include a hydraulic circuit configured to supply the transmission and the output transfer group with high- and low-pressure flows of fluid. The hydraulic circuit may have a first sump configured to collect fluid drained from the transmission, a second sump configured to collect fluid drained from the output transfer group, an internal transmission pump configured to draw fluid from the first sump and generate the high- and low-pressure flows of fluid, and a scavenge pump driven by the engine to transfer fluid from the second sump into the first sump. The hydraulic circuit may also have a single cooler configured to cool the low-pressure flow of fluid before the low-pressure flow of fluid is directed to either of the transmission or the output transfer group, and a single filter configured to filter the high-pressure flow of fluid before the high-pressure flow of fluid is directed to either of the transmission or the output transfer group. The hydraulic circuit may further have a single low-pressure relief valve associated with the internal transmission pump, a single high-pressure relief valve located downstream of the single filter, and a restrictive orifice located downstream of the single cooler and configured to divert a majority of the low-pressure flow of fluid to the transmission.

DETAILED DESCRIPTION

Figure 1:
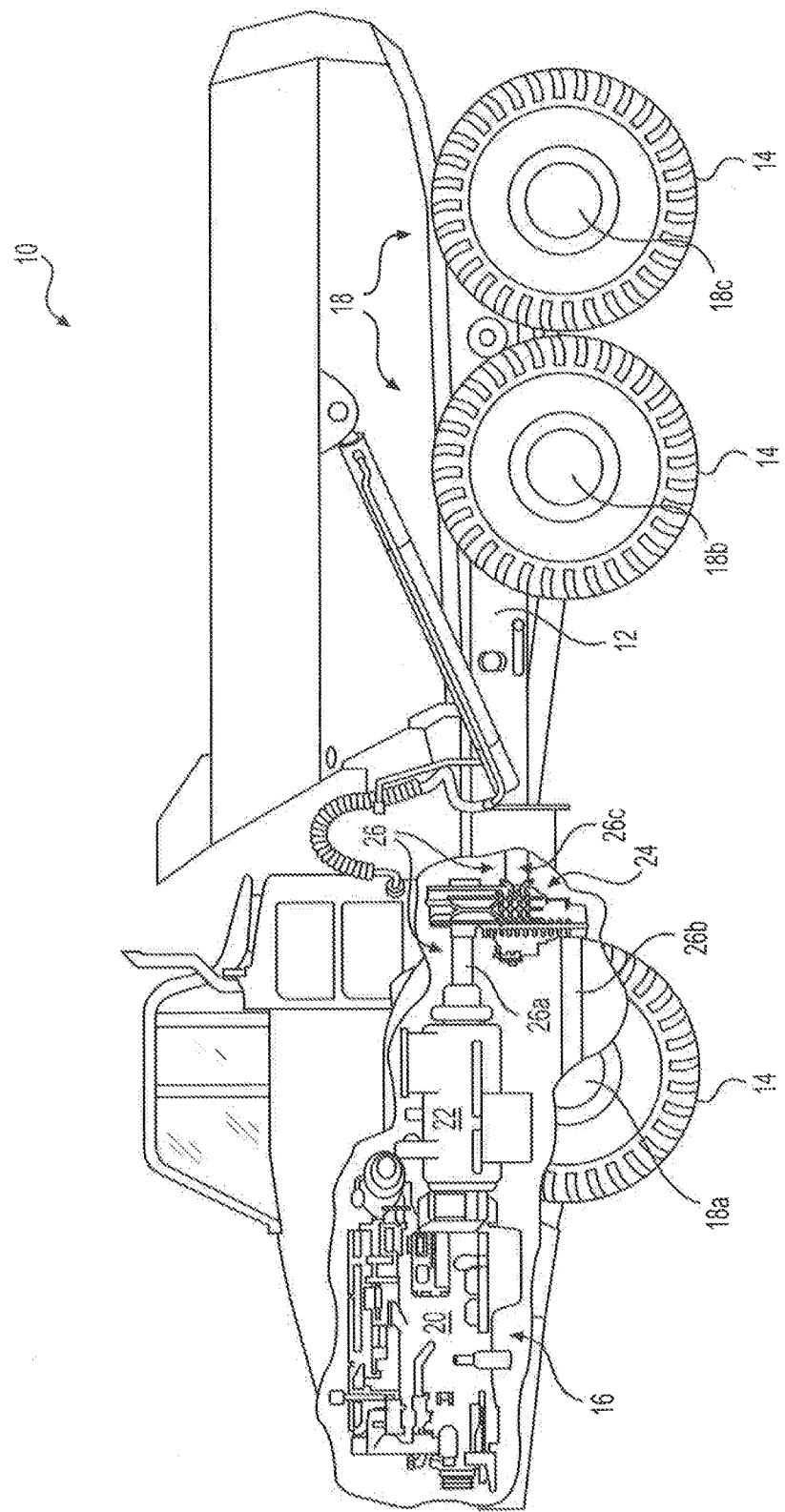
FIG. 1 is an isometric illustration of an exemplary disclosed machine.

FIG. 1 illustrates an exemplary mobile machine 10, In the depicted embodiment, machine 10 is an articulated haul truck. It is contemplated, however, that machine 10 may embody another type of mobile machine such as wheel loader, an off-highway mining truck, a motor grader, or another machine known in the art. Machine 10 may include a frame 12, one or more traction devices 14 rotatably supporting frame 12, and a powertrain 16 operatively situated to drive some or all of traction devices 14. In the disclosed embodiment, traction devices 14 are wheels arranged in pairs, with each pairing connected to a different axle 18. For example, the disclosed haul truck has a front axle 18a and two tandem rear axles 18b, 18c, for a total of six wheels. It is contemplated, however, that in other embodiments, a different type and/or number of traction devices 14 may be included and arranged in any manner known in the art. Some or all of axles 18 may be selectively driven by powertrain 16 to rotate traction devices 14, as will be described in more detail below.

As also shown in FIG. 1, powertrain 16 may be an assembly of components that produces power and directs the power to axles 18. In the disclosed embodiment, these components include an engine 20, a transmission 22 that is operatively connected to and driven by engine 20, an output transfer group (OTG) 24, and one or more shafts 26 that connect transmission 22 to OTG 24 and OTG 24 to axles 18. In the disclosed embodiment, at least three different shafts 26 are shown, including a single input shaft 26a connecting transmission 22 to OTG 24, a front output shaft 26b connecting OTG 24 to front axle 18a, and a rear output shaft 26c connecting OTG 24 to one or both of the tandem rear axles 18b, 18c. OTG 24 may be functional to transmit power from input shaft 26a to both front and rear output shafts 26b, 26c.

Figure 2:
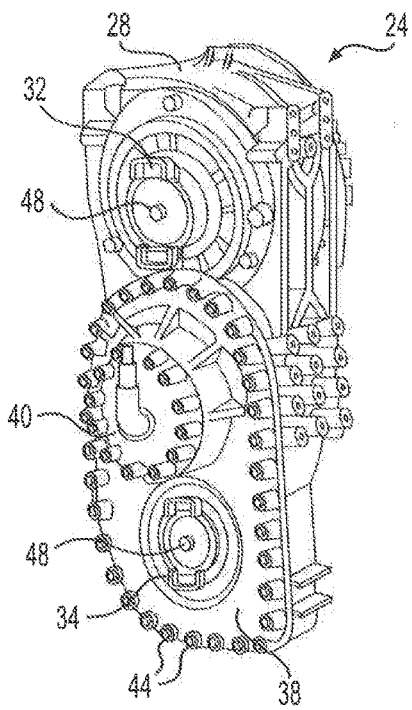
FIGS. 2 and 3 are front and rear isometric view illustrations of an exemplary disclosed output transfer group that may be used in conjunction with the machine of FIG. 1.
Figure 3:
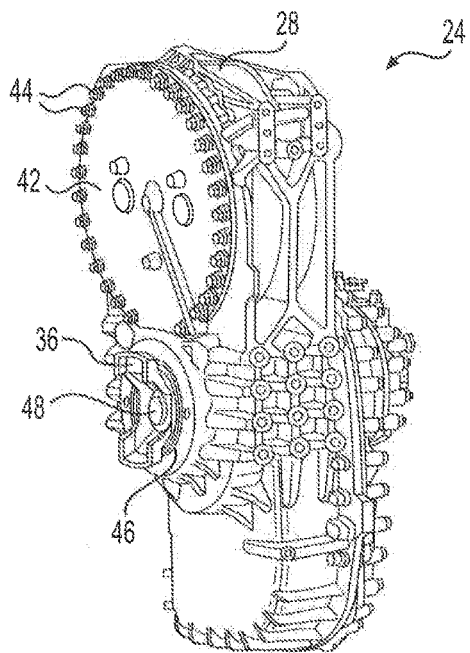
Figure 4:
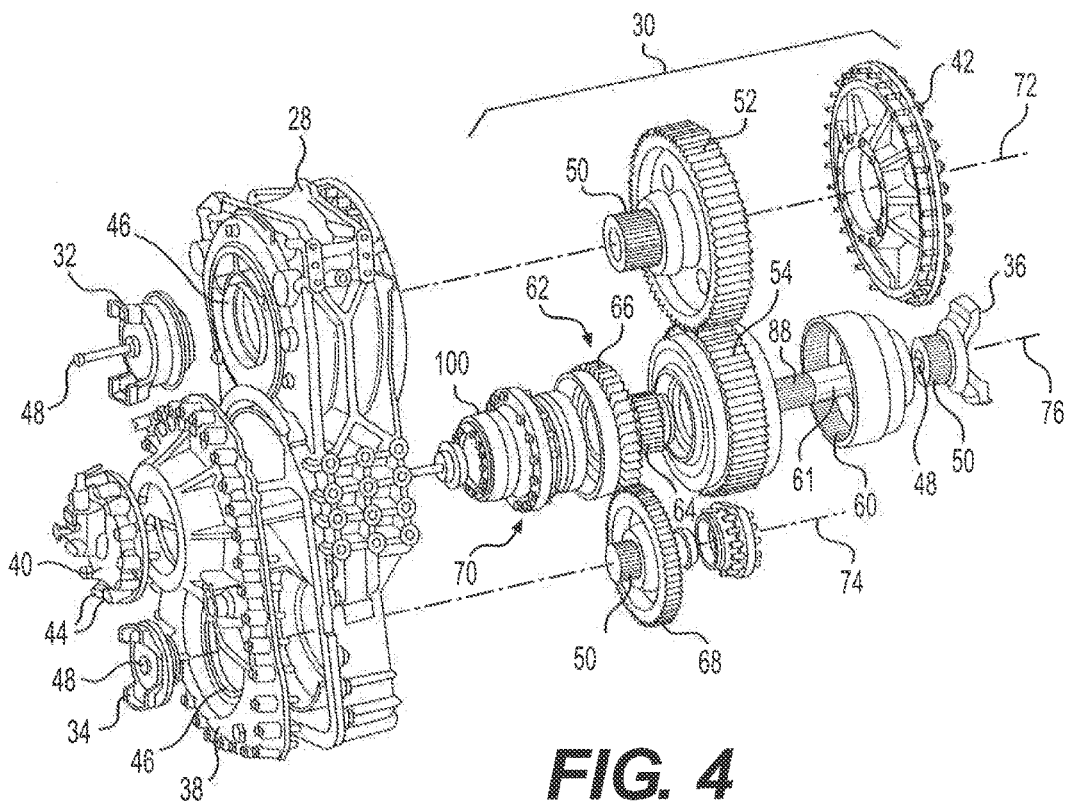
FIG. 4 is an exploded view illustration of the output transfer group of FIGS. 2 and 3.

An exemplary physical embodiment of OTG 24 is shown in FIGS. 2-4. OTG 24 may include, among other things, a housing 28 (e.g., a lightweight aluminum housing), a gear train 30 mounted inside housing 28, an input yoke 32 configured to transmit power from input shaft 26a to drive gear train 30, a front output yoke 34 driven by gear train 30 to rotate output shaft 26b, and a rear output yoke 36 driven by gear train 30 to rotate output shaft 26c. In addition, OTG 24 may include a front cover 38 configured to mate against a front side of housing 28, a fluid manifold 40 configured to engage front cover 38 and fluidly communicate with gear train 30, and a rear cover 42 configured to mate against a rear side of housing 28. Front and rear covers 38, 42 may be connected to housing 28 and manifold 40 may be connected to front cover 38 via fasteners 44.

Housing 28, together with front and rear covers 38, 42, may substantially enclose gear train 30, with only yokes 32-36 protruding therefrom, input and front output yokes 32, 34 may protrude from the front side of housing 28, while rear yoke 36 may protrude from the rear side. Input yoke 32 may be located gravitationally highest (i.e., when OTG 24 is mounted within machine 10), front yoke 34 may be located gravitationally lowest, and rear yoke 36 may be located between input yoke 32 and front yoke 34. Manifold 40 may be generally aligned with rear yoke 36. One or more seals (e.g., rotating lip seals) 46 may be located at openings within housing 28, front cover 38, and rear cover 42 to inhibit lubrication leakage from housing 28 at yokes 32-36. Yokes 32-36 may connect to corresponding components of gear train 30 via one or more fasteners 48 and a spliced interface 50.

Figure 5:
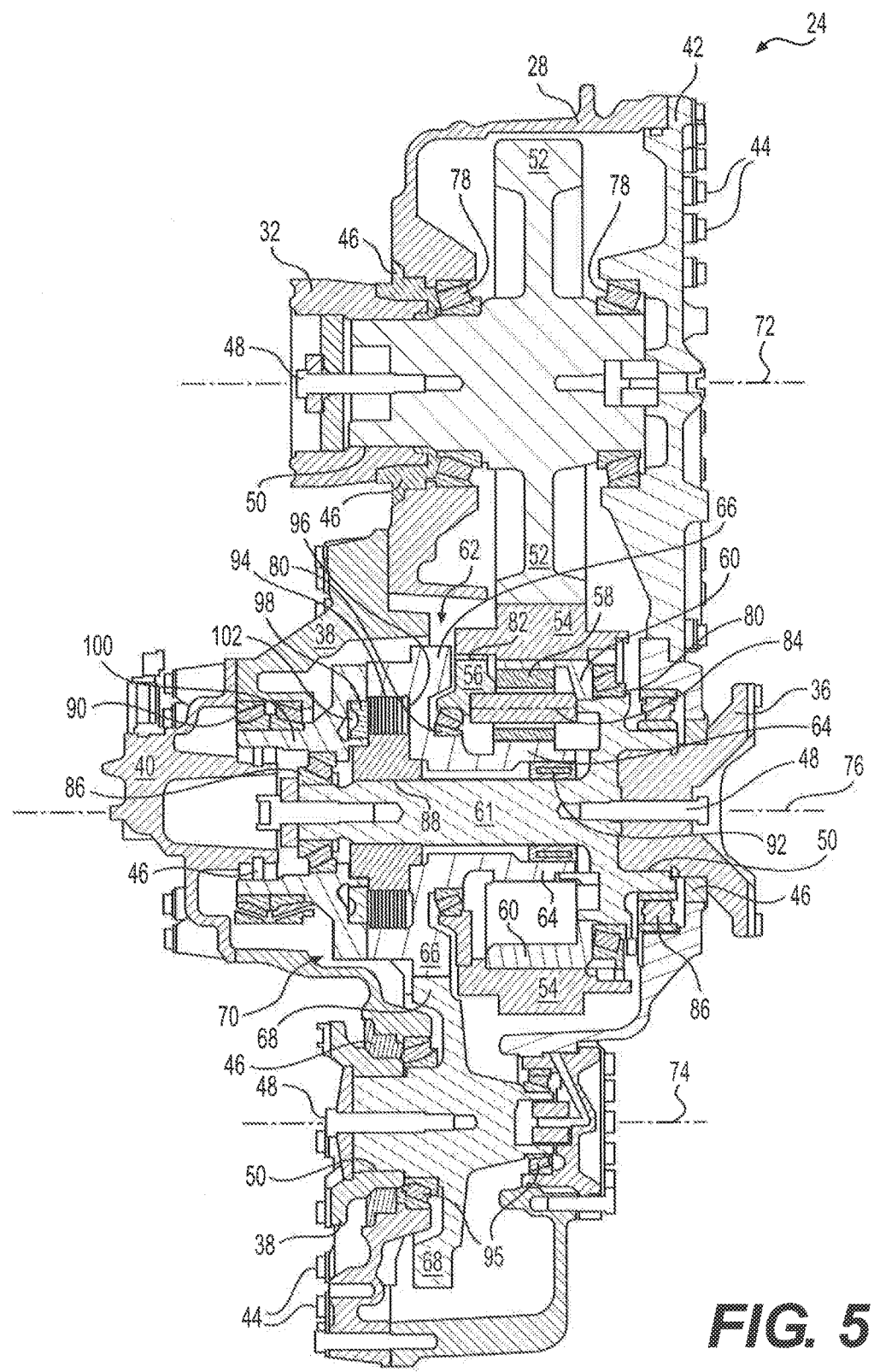
FIG. 5 is a cross-sectional illustration of the output transfer group of FIGS. 2-4.

As shown in FIGS. 4 and 5, gear train 30 may include multiple intermeshing components that cooperate to transfer an input rotation received via input yoke 32 to both of front and rear output yokes 34, 36. These components may include, among other things, an input spur gear 52, a hollow gear 54, a planet carrier 56 having a plurality of planet gears 58 connected thereto, a ring gear 60, a stub shaft 61, a cluster 62 having a sun gear 64 integrally formed with a spur gear 66, an output spur gear 68, and a clutch 70. Each of these components may be arranged to rotate about one of three different axes (i.e., an input axis 72, a first output axis 74, and a second output axis 76) aligned with input yoke 32, front output yoke 34, and rear output yoke 36, respectively. As will be described in more detail below, clutch 70 may be selectively activated to connect lock different combinations of the various gears together to provide for equal or unequal rotational speeds of front and rear output yokes 34, 36.

Spur gear 52 may be supported within an upper-third of housing 28 by way of bearings 78 located at opposing ends. A front end of spur gear 52 may extend out of the front side of housing 28 to engage input yoke 32 by way of fastener 48 and splined interface 50, while a rear and shorter end may terminate inside housing 28 short of rear cover 42. In this configuration, a rotation of input yoke 32 may result in a corresponding rotation of spur gear 52 about first axis 72. Spur gear 52, in the disclosed example, has sixty-three teeth formed within an outer periphery.

Hollow gear 54 may be supported within a middle-third of housing 28 by way of bearings 80 located at opposing ends. Hollow gear 54 may resemble a sleeve or drum having gear teeth formed within a narrow annular band around an outer periphery. In this configuration, the narrow annular band may be centered in an axial direction of the sleeve, such that annular bands or borders without gear teeth exist at ends of the gear teeth. In one example, an axial width of the gear teeth may be about equal to $\frac{1}{3}$-$\frac{1}{2}$ of an axial length of hollow gear 54. In the disclosed example, hollow gear 54 has fifty-two gear teeth and is configured to rotate about third axis 76.

Planet carrier 56, together with planet gears 58, may be nested inside hollow gear 54. That is, planet carrier 56 and planet gears 58 may have an axial length that is about the same as the axial length of hollow gear 54, and an outer diameter that is less than an inner diameter of hollow gear 54. In addition, planet carrier 56 may be configured to rotate about third axis 76, allowing planet carrier 56 and planet gears 58 to nest inside hollow gear 54. The nesting of planet carrier 56 and planet gears 58 inside hollow gear 54 may help reduce a footprint and weight of OTG 24. In the disclosed embodiment, planet carrier 56 may be supported within hollow gear 54 by way of a splined interface 82, and five planet gears 58 (only one shown in FIG. 5) may be connected to and extend rearward from planet carrier 56. Each of planet gears 58 may include external teeth and be configured to rotate about their own axis 84 as they orbit third axis 76.

Ring gear 60 may be situated to rotate about third axis 76 and radially located between planet gears 58 and an inside annular surface of hollow gear 54. Ring gear 60 may connect to a rear end of stub shaft 61 (e.g., by way of splines, welding, integral casting, or fasteners), and extend forward over planet gears 58 toward planet carrier 56. Ring gear 60 may have a plurality of internal gear teeth.

Stub shaft 61 may be supported within the middle-third of housing 28 by way of bearings 86 located at opposing ends. A rear end of stub shaft 61 may extend to a rear opening of housing 28 and engage rear output yoke 36 by way of fastener 48 and splined interface 50, while a front end may extend through a front opening of housing 28 and into front cover 38. In this configuration, a rotation of stub shaft 61 may result in a corresponding rotation of rear output yoke 36 about third axis 76. A middle section of stub shaft 61 may have splines 88 formed thereon.

Cluster 62 may be an integral component having sun gear 64 formed at a rear end and spur gear 66 formed at a front end. Cluster 62 may be supported at the front end within the middle-third of housing 28 by clutch 70, and at the rear end by way of hearings 92. The rear end of cluster 62 may be located radially between stub shaft 61 and planet gears 58. The front end of cluster 62 may include internal splines or cogs 94. Sun gear 64 may have half as many teeth as ring gear 60.

Spur gear 68 may be supported within a lower-third of housing 28 by way of bearings 95 located at opposing ends. A front end of spur gear 68 may extend out of housing 28 to engage front output yoke 34 by way of fastener 48 and splined interface 50, while a rear and shorter end may terminate inside housing 28. In this configuration, a rotation of spur gear 68 may result in a corresponding rotation of output yoke 34 about second axis 74. Spur gear 68, in the disclosed example, has the same number of teeth formed within an outer periphery as spur gear 66.

Clutch 70 may itself be a sub-assembly of multiple components arranged to rotate along third axis 76. For example, clutch 70 may include a disk stack 96, a hydraulic actuator 98 configured to selectively compress disk stack 96, and a housing 100 that encloses disk stack 96 and actuator 98. Housing 100 may be rotatably supported between bearings 86 at an internal surface and one or more bearings 90 at an external surface.

Disc stack 96 may include a plurality of friction discs, a plurality of separator plates interleaved with the friction discs and, in some instances, a damper (not shown) located at one or both ends of disc stack 96. The friction discs may be connected to rotate with one of stub shaft 61 and cluster 62 (e.g., by way of splines 88 or 94), while the separator plates may be connected to rotate with the other of stub shaft 61 and cluster 62. In this manner, when hydraulic actuator 98 is activated, the friction discs may be sandwiched between the separator plates, thereby creating friction that allows for the transmission of torque between stub shaft 61 and cluster 62. A pressure of fluid within hydraulic actuator 98 may relate to a magnitude of the friction resisting relative rotation.

Hydraulic actuator 98 may embody a service piston that works to compress disk stack 96 under different conditions. The service piston may be ring-like and, together with housing 100, form a control chamber 102. When control chamber 102 is filled with pressurized oil, hydraulic actuator 98 may be urged toward disk stack 96, thereby compressing disc stack 96.

In some embodiments, one or more springs (not shown) may be arranged in various configurations to bias hydraulic actuator 98 away from disc stack 96. In these configurations, when pressurized fluid is not supplied into control chamber 102, hydraulic actuator 98 may be deactivated by the springs and moved away from disc stack 96 to reduce the friction generated between the plates thereof. In the disclosed example, springs are not included as it may be unnecessary (and undesired) to move hydraulic actuator 98 away from disc stack 96.

Figure 6:
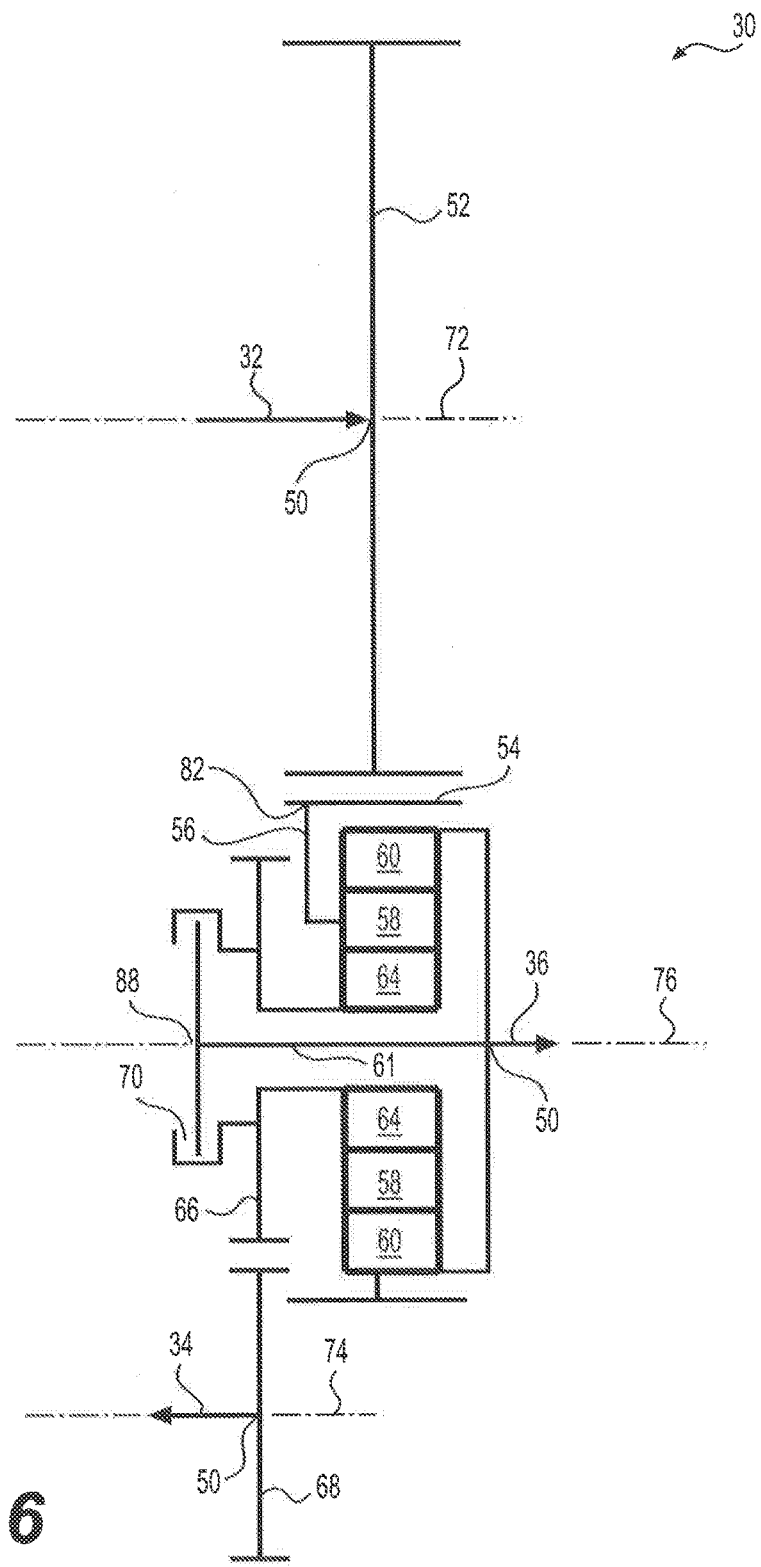
FIG. 6 is a stick-figure illustration of the output transfer group of FIGS. 2-5.

FIG. 6 is a simplified illustration of the connections and flows of power through the components of gear train 30. Power can be introduced to gear train 30 along axis 72 by way of input yoke 32. This power may be transmitted to spur gear 52 via splined interface 50. The external gear teeth of spur gear 52 may mesh with the external gear teeth of hollow gear 54, thereby transmitting the power to the components aligned on axis 76. Because of the difference in the number of teeth between spur gear 52 and hollow gear 54, hollow gear 54 may rotate faster (and with less torque) at a ratio of the number of teeth in the respective gears. In particular, hollow gear 54 may rotate at a speed that is 63/52 times a speed of spur gear 52 and in an opposite direction. Because of the torque reduction achieved at this upstream location, downstream components (e.g., clutch 70) may be designed (e.g., reduced in size and weight) to handle the lower amount of torque.

Planet carrier 56 may be connected to hollow gear 54 via splined interface 82, thereby causing planet carrier 56 to rotate when hollow gear 54 rotates. The rotation of planet carrier 56 may cause planet gears 58 to orbit sun gear 64, while also rotating about their own axes 84. The external gear teeth of planet gears 58 may mesh with both the internal gear teeth of ring gear 60 and the external gear teeth of sun gear 64, thereby creating five different power flow paths between these components (i.e., one low path for each planet gear 58).

In the disclosed configuration, planet carrier 56, planet gears 58, ring gear 60, and sun gear 64 may together function as a differential. And due to the number of gear teeth (67) in ring gear 60 being twice the number of gear teeth (33) in sun gear 64, the amount of torque transferred through ring gear 60 (and on to rear axles 18*b*, 18*c*—see FIG. 1) may be about twice the amount of torque (67/33≈2) transferred through sun gear 64 (and on to front axle 18*a*). Thus the total torque received by OTG 24 may be split about 1:2 between front axle 18*a* and rear axles 18*b*, 18*c* (i.e., between front output yoke 34 and rear output yoke 36), such that each axle 18 receives a substantially even amount (e.g., about one-third) of the total torque (within manufacturing tolerances, such that axles 18 have effectively the same speed). With ring gear 60 and sun gear 64 functioning as the outputs of the differential, these gears may have the same nominal speed under good traction conditions, but in operation under poor traction conditions may allow for a speed difference that improves handling of machine 10. Ring gear 60 may be connected to stub shaft 61 (e.g., via a splines, welding, integral casting, or fastening), and stub shaft 61 in turn may be connected to rear yoke 36 via splined interface 50. Sun gear 64, being integral with spur gear 66, may transfer power to spur gear 68 by way of spur gear 66. That is, the external gear teeth of spur gear 66 may mesh with the external gear teeth of spur gear 68 and, because spur gear 66 may have the same number of gear teeth as spur gear 68, the two gears may rotate at the same speed but in opposite directions.

Clutch 70 may function as a differential lock, and selectively prevent relative motion between ring gear 60 and sun gear 64 when actuated. In particular, when control chamber 102 (referring to FIG. 5) is pressurized, hydraulic actuator 98 may compress disk stack 96 (i.e., sandwich the friction plates between the separator plates), thereby locking ring gear 60 to sun gear 64 by way of splines 88, splines 94, cluster 62, stub shaft 61, and ring gear 60. When this happens, spur gear 68 (along with front axle 18*a*) and ring gear 60 (along with rear axles 18*b*, 18*c*) may be constrained to rotate at the same speed. In this situation, the differential's torque splitting function may be bypassed and the actual axle torque splits may be determined based on an available traction and a weight distribution of machine 10.

The time it takes for clutch 70 to actuate and lock the differential may be affected by an amount of time it takes hydraulic actuator 98 (referring to FIG. 5) to move to and compress disk stack 96. In order to shorten this time and thereby improve the responsiveness of OTG 24, it may be desirable to keep control chamber 102 constantly pressurized to some degree, such that hydraulic actuator 98 is always touching disk stack 96. In particular, if control chamber 102 were to be drained during clutch deactivation, hydraulic actuator 98 could move far enough away from disk stack 96 such that hydraulic actuator 98 would no longer be touching disk stack 96. When this happens, hydraulic actuator 93 would have a greater distance to move during clutch actuation before compression of disk stack 96 could even begin, and this movement would result in a delay. The minimum level of pressure maintained within control chamber 102 (in combination with the relatively slow speeds of OTG 24), however, may not be enough to cause significant compression of disk stack 96 and any loss of efficiency. In the disclosed embodiment, the minimum pressure level may be about 1-2 psi. During actuation of clutch 70, a higher pressure of about 30-500 psi may be used to cause hydraulic actuator 98 to compress disk stack 96.

Figure 7:
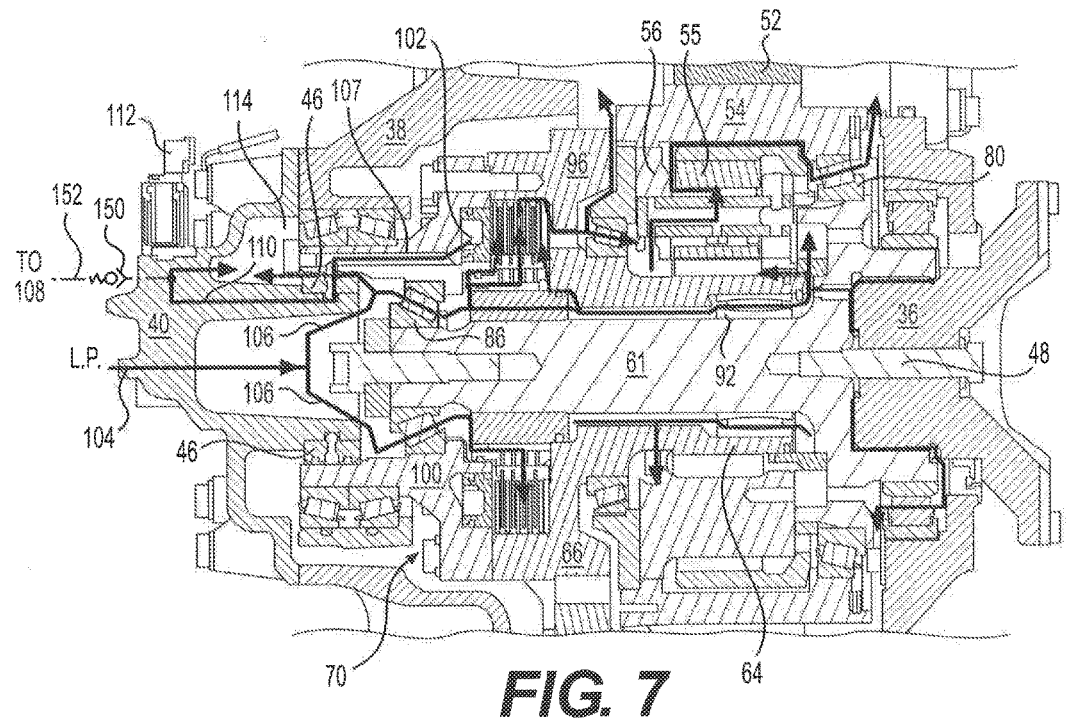
FIGS. 7 and 8 are cross-sectional and schematic illustrations of a portion of the output transfer group of FIGS. 2-6.
Figure 8:
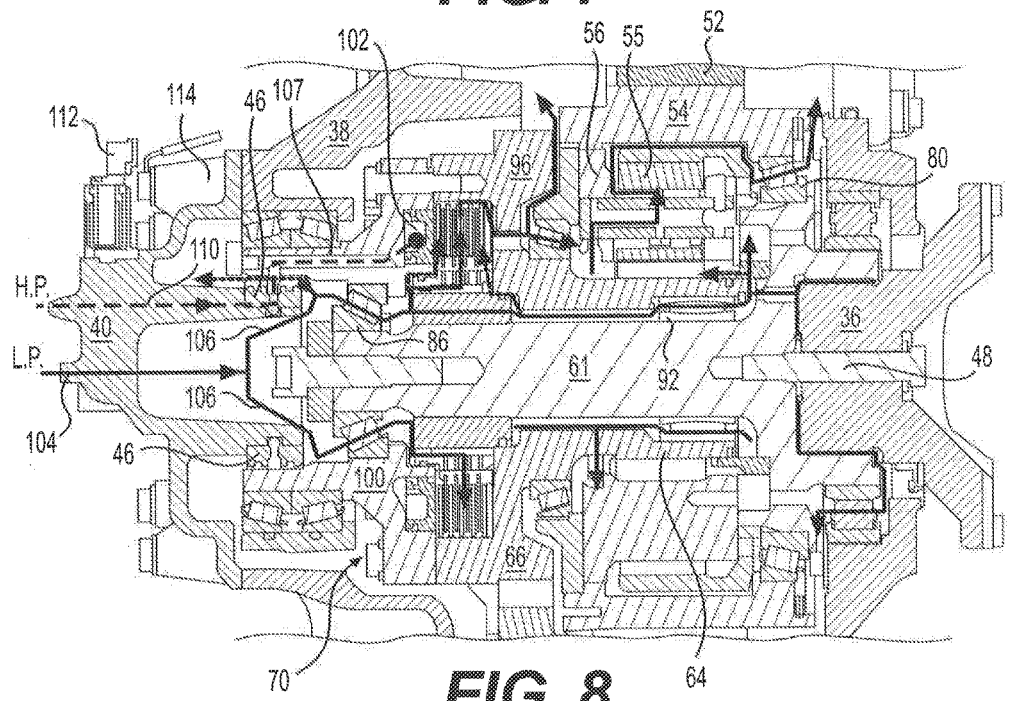

FIGS. 7 and 8 illustrate exemplary flow paths of oil used to lubricate gear train 30 and to control operation of clutch 70. In particular, FIG. 7 shows flow paths that can be used when clutch 70 is not being actuated, while FIG. 8 shows the flow paths that can be used when clutch 70 is being activated. As can be seen in both of these figures, a main flow 104 of low-pressure lubricating oil may always be directed into housing 28 via manifold 40 during operation of machine 10, regardless of the status of clutch 70. After entering manifold 40, main flow 104 may split into multiple parallel flows 106, each of which may pass axially toward the rear side of housing 28 and radially outward through the various components of gear train 30 (e.g., through bearings 86, disk stack 96, stub shaft 61, cluster 62, splined interfaces 50, seals 46, planet gears 58, bearings 80, bearings 86, splines 88, splines 94, etc). After passing through these and/or other components of gear train 30, the low-pressure lubricating oil may be drawn by gravity down into a sump 108 located at a bottom of housing 28 (see FIG. 9). At the same time, a portion 107 of parallel flows 106 may pass through clutch housing 100 to fill control chamber 102, one or more control passages 110 extending to control chamber 102, one or more control valves 112, and/or one or more cavities 114 in clutch housing 100 that will subsequently be filled with high-pressure control oil and used to activate hydraulic actuator 98. The low-pressure lubricating oil inside control chamber 102 may cause hydraulic actuator 98 to maintain contact with disk stack 96, without causing unintentional activation of clutch 70. It should be noted that "high-pressure" and "low-pressure" are relative terms and not necessarily tied, to particular values. By keeping the passages, chambers, and cavities constantly full of oil, there may not be a delay during clutch activation while waiting for these features to till with high-pressure oil before control chamber 102 can be pressurized.

As shown in FIG. 8, when it is desired to activate clutch 70, high-pressure control oil may be directed through control valve 112 and control passage 110 to control chamber 102. Because these features may already have been filled with low-pressure lubricating oil, little time may be required for these features to rise to a pressure high-enough to cause activation of clutch 70. That is, minimal time may be wasted filling these features with high-pressure control oil as they may already be hill of low-pressure lubricating oil. Instead, the oil inside the features may need only to have its pressure elevated by connection to a high-pressure source. This connection may be facilitated by movement of control valve 112.

When deactivation of clutch 70 is desired, control valve 112 may move to block the flow of high-pressure control oil through passage 110. Thereafter, high-pressure control oil inside passage 110, cavity 114, and control chamber 102 may leak out through seal 46 to cavity 114 and join parallel flows 106 of low-pressure lubricating oil passing through the rest of gear train 30. This leakage may allow for a reduction in pressure within control chamber 102, such that the springs are able to push actuator 98 to a non-activated position against disk stack 96.

In some embodiments, the pressure inside control chamber 102 may need to be lower than the pressure of the lubricating oil, in order to ensure deactivation of clutch 70 when control valve 112 is moved to block the flow of high-pressure fluid. In these embodiments, a check valve 150 may be disposed in a drain passage 152 that communicates with control chamber 102. It is contemplated that check valve 150 may form a portion of control valve 112 or be a separate stand-along component, as desired.

Figure 9:
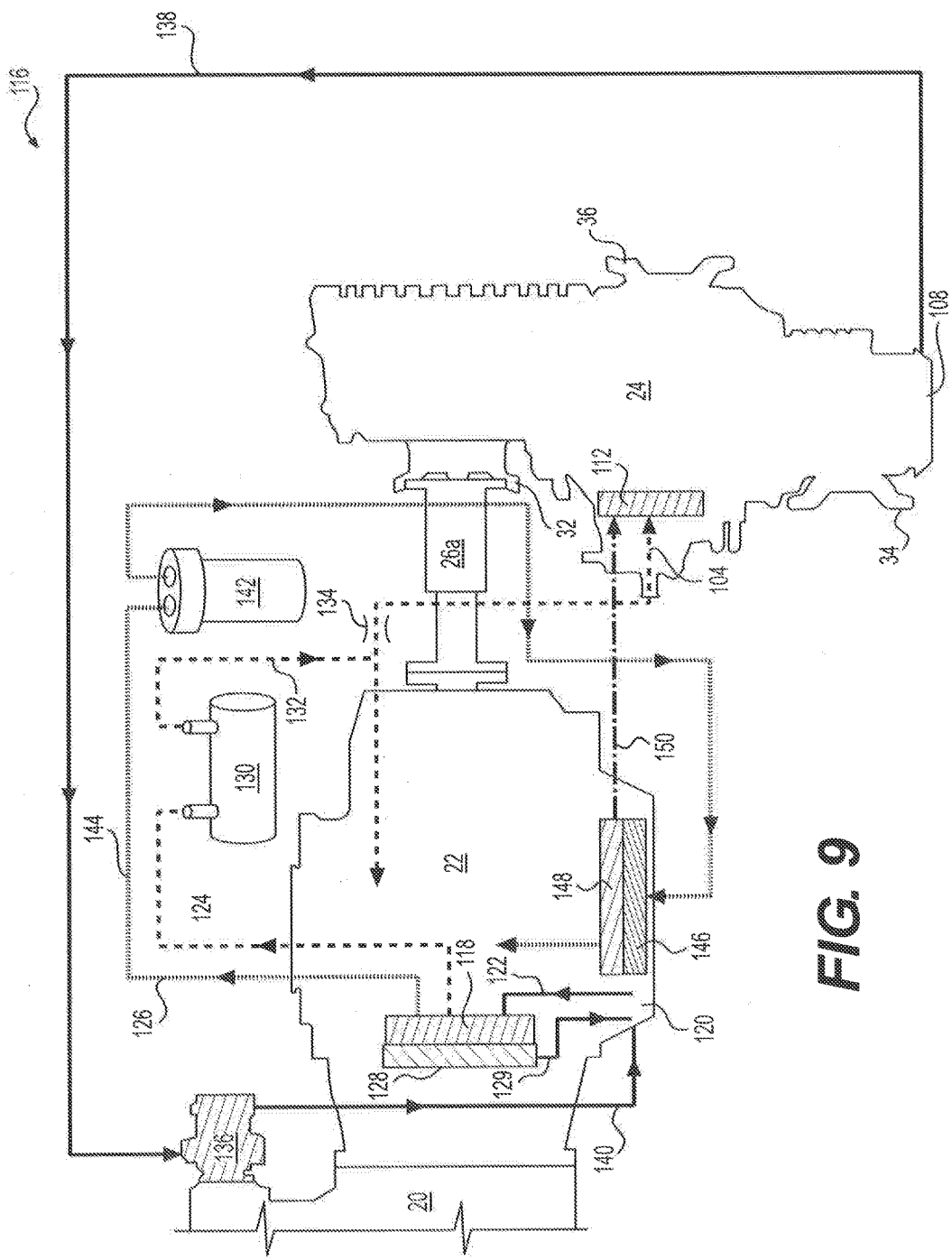
FIG. 9 is a schematic illustration of an exemplary disclosed hydraulic circuit that may be used in conjunction with the output transfer group of FIGS. 2-8.

FIG. 9 illustrates a hydraulic circuit 116 that may be used to supply OTG 24 with low- and high-pressure lubricating and control oil. As shown in this figure, OTG 24 may share hydraulic circuit 116 with transmission 22. Specifically, hydraulic circuit 116 may include a primary pump 118 configured to draw fluid from a transmission sump 120 via a sump passage 122, and to pressurize the fluid to two different levels (i.e., to the low-pressure level and the high-pressure level described above). Primary pump 118 may be a stand-alone pump or a conventional transmission pump normally packaged together with (e.g., inside of) transmission 22. The low- and high-pressure fluid flows may be discharged from primary pump 118 via low- and high-pressure passages 124 and 126, respectively. A pressure relief valve 128 may be associated with primary pump 118 and configured to selectively relieve fluid from one or both of passages 124, 126 when a pressure of fluid within the passages exceeds desired levels. This relieved fluid may be directed back to sump 120 via a drain passage 129.

The low-pressure fluid may pass through a cooler 130 (e.g., a liquid-to-liquid or liquid-to-air heat exchanger), and then be directed in parallel through transmission 22 and OTG 24 via a supply passage 132. Supply passage 132 may communicate with main flow 104 discussed above, In some embodiments, a restricted orifice 134 may be disposed between supply passage 132 and main flow 104, such that a desired amount (e.g., a majority flow) of the low-pressure fluid may diverted through transmission 22. The low-pressure fluid passing through transmission 22 may be drawn by gravity down into sump 120 for reuse. Likewise, the low-pressure fluid passing through OTG 24 may drain down into sump 108. A scavenge pump 136 (e.g., a dedicated engine-driven pump) may be in communication with OTG sump 108 via a return passage 138, and configured to transport fluid collected within sump 108 to sump 120 of transmission 22 via a passage 140. These flows of low-pressure fluid may be substantially continuous throughout operation of machine 10.

The high-pressure fluid may be directed from primary pump 118 first through a filter 142 by way of a supply passage 144, and then through a high-pressure relief valve 146 associated with transmission 22. Relief valve 146 may be configured to selective relieve fluid from passage 144 into sump 120 when a pressure of the fluid exceeds a desired level. From relief valve 146, the high-pressure fluid may be directed in parallel to one or more control valves 148 associated with transmission 22 and also to control valve 112 associated with clutch 70 (referring to FIGS. 3-8) of OTG 24 via a passage 150, Control valves 148 may be used to control operation of a torque converter and/or clutches that form a part of transmission 22. Control valve 112, as described above, may be used to control activation of clutch 70. It should be noted that, while control valve 112 has been shown and described as being mounted to and/or within OTG 24, it is contemplated that control valve 112 could alternatively he mounted to and/or within transmission 22 (or elsewhere, if desired).

INDUSTRIAL APPLICABILITY

While the output transfer group of the present disclosure has potential application in any machine with multiple axles, the disclosed transmission system may be particularly applicable to articulated haul trucks, wheel loaders, and other heavy construction machines. Such machines have specific speed and torque requirements that the disclosed output transfer group may be especially capable of meeting. The disclosed output transfer group may be lightweight, compact, and have reduced hydraulic requirements. Operation of machine 10 will now be explained.

During operation of machine 10, depending on specific application and user preference, clutch 70 may be selectively operated in a disengaged state. In this state, torque received by input yoke 32 (referring to FIGS. 4 and 6), may be consistently split between output yokes 34 and 36 in a fixed ratio dependent on the number of teeth in ring and sun gears 60, 64 (e.g., 1:2). Assuming straight travel on level ground with good traction, this may result in yokes 34 and 36 (as well as axles 18a-c) rotating at about the same speed. However, in certain situations (e.g., when steering or under poor ground conditions), wheel conditions may result in output yokes 34 and 36 (as well as axles 18a-c) rotating at different speeds. In some applications, selectively operating clutch 70 in the engaged state may improve handling (e.g., steering) of machine 10.

In other applications, however, allowing axles 18 to rotate at different speeds may be undesirable. For example, in certain situations (e.g., during travel over poor ground conditions and/or during uphill travel), when one axle 18 loses traction and spins faster than another axle 18, all axles 18 may individually experience a reduction in power transferred to the ground, possibly resulting in a loss of machine speed. In this situation, clutch 70 may be selectively activated (e.g., manually and/or automatically based on sensed conditions) to reduce or eliminate disruptions to machine speed.

When clutch 70 is activated, the rotation of output yoke 34 may be locked to the rotation of output yoke 36. Accordingly, regardless of ground conditions, all axles may be rotated at about the same speed. In this situation, when any one axle 18 begins to lose traction, the torque normally routed through the slipping axle may be shifted to the gripping axles 18, thereby allowing improved propulsion of machine 10.

Many advantages may be associated with the disclosed OTG 24. For example, the arrangement of gear train 30 may provide for a reduced size and weight of OTG 24. In particular, by locating clutch 70 downstream of a first speed-increasing gear set (i.e., a first torque-reducing gear set), clutch 70 may be required to transmit a lower level of torque between associated gears. This may allow for a reduction in the capacity of clutch 70, which may correspond with a smaller size and weight.

In addition, the arrangement of the differential (i.e., planet carrier 56, planet gears 58, ring gear 60, and sun gear 64) downstream of the first torque-reducing gear set may allow for smaller and/or fewer components. For example, a single set of planet gears 58 may be used to transfer torque between ring gear 60 and sun gear 64. This reduced number and size of components may allow for nesting of the components inside hollow gear 54, thereby further reducing an amount of space taken up by OTG 24. In addition, by utilizing five planet gears 58, a greater number of power flow paths (i.e., when compared to another style of differential, such as a bevel gear or Ravigneaux differential) may be created between ring and sun gears 60, 64, which may allow for a more compact OTG 24 for a given torque loading.

Further, because of the unique arrangement of gear train 30, fewer large transfer gears may be required. In particular, because gear train 30 may allow for direct drive of rear axles 18b and 18c from the differential, gear train 30 may require only four large transfer gears (i.e., spur gear 52, hollow gear 54, spur gear 66, and spur gear 68). This reduction in the number of transfer gears may help to further reduce a size and weight of OTG 24.

The disclosed OTG 24 may be highly responsive. Specifically, because hydraulic actuator 98 may be maintained in contact with disk stack 96, a time required for clutch 70 to change between the deactivated state and the activated state may be small. And because the speeds of OTG 24 and the pressure used to maintain this contact may be low, any efficiency loss associated with the contact may likewise be low. Further, because low-pressure lubrication oil (instead of high-pressure control oil) may be used to maintain the desired contact between hydraulic actuator 98 and disk stack 96, the fluid power and control requirements of clutch 70 may be low.

In addition, savings may be realized by hydraulically connecting OTG 24 with the associated transmission 22. For example, fewer components (e.g., filters, coolers, accumulators, relief valves, etc.) may be required. Fewer components may result in greater efficiency, improved reliability, lower cost, lower weight, and a smaller footprint.

It will be apparent to those skilled in the art that various modifications and variations can be made to the output transfer group of the present disclosure without departing from the scope of the disclosure. Other embodiments will be apparent to those skilled in the art from consideration of the specification and practice of the output transfer group disclosed herein. For example, although shafts 26 are described herein as being connected to OTG 24 by way of yokes 32-36, it may be possible to make a similar connection using other coupling devices known in the art. In addition, although particular gears of gear train 30 have been described and shown as spur gears, it may be possible for other types of gears (e.g., helical gears) to alternative be used, as desired. Further, although the disclosed OTG is described as having five planet gears 58, it is contemplated that a different number of gears could alternatively be used based, as needed, to accommodate different loading scenarios. It is intended that the specification and examples be considered as exemplary only, with a true scope of the disclosure being indicated by the following claims and their equivalents.

What is claimed is:

1. A hydraulic circuit for a powertrain having an engine, a transmission, and an output transfer group, the hydraulic circuit comprising:
   a first sump disposed within a transmission housing and configured to collect fluid drained from the transmission;
   a second sump, disposed within an output transfer group housing that is spaced from and independent of the transmission housing, configured to collect fluid drained from the output transfer group; and
   a primary pump positioned inside the transmission and configured to draw fluid from the first sump and generate at least one flow of pressurized fluid directed to the transmission and to the output transfer group.

2. The hydraulic circuit of claim 1, wherein the at least one flow of pressurized fluid includes:

a high-pressure flow of fluid directed to both the transmission and the output transfer group; and
a low-pressure flow of fluid, provided simultaneously with and parallel to the high-pressure flow of fluid, directed to both the transmission and the output transfer group.

3. The hydraulic circuit of claim 2, further including a scavenge pump configured to transfer fluid from the second sump into the first sump.

4. The hydraulic circuit of claim 3, wherein the scavenge pump is mechanically coupled to and driven by the engine.

5. The hydraulic circuit of claim 2, further including a single cooler configured to cool the low-pressure flow of fluid before the low-pressure flow of fluid is directed to either of the transmission or the output transfer group.

6. The hydraulic circuit of claim 5, further including a single filter configured to filter the high-pressure flow of fluid before the high-pressure flow of fluid is directed to either of the transmission or the output transfer group.

7. The hydraulic circuit of claim 6, further including a single low-pressure relief valve associated with the primary pump.

8. The hydraulic circuit of claim 7, further including a single high-pressure relief valve located downstream of the single filter.

9. The hydraulic circuit of claim 8, further including at least a first control valve located downstream of the single high-pressure relief valve and configured to regulate transmission operation.

10. The hydraulic circuit of claim 9, further including at least a second control valve configured to regulate operation of the output transfer group, wherein the high-pressure flow of fluid is received by the at least a second control valve.

11. The hydraulic circuit of claim 5, further including a restrictive orifice located downstream of the single cooler and configured to divert a majority of the low-pressure flow of fluid to the transmission.

12. A method of lubricating a power system having an engine, a transmission, and an output transfer group, the method comprising:
collecting fluid from the transmission in a transmission sump disposed within a transmission housing;
collecting fluid from the output transfer group in an output transfer group sump disposedwithin an output transfer group housing, wherein the output transfer group housing is spaced from and independent of the transmission housing;
pressurizing the fluid collected from the transmission sump using a primary pump positioned inside the transmission; and
directing at least one flow of the pressurized fluid from the primary pump to the transmission and to the output transfer group.

13. The method of claim 12, wherein the at least one flow of the pressurized fluid includes:
a high-pressure flow of fluid directed to both the transmission and the output transfer group; and
a low-pressure flow of fluid, provided simultaneous with and in parallel to the high-pressure flow of fluid, directed to both the transmission and the output transfer group.

14. The method of claim 13, wherein:
further comprising transferring fluid from the output transfer group sump to the transmission sump.

15. The method of claim 13, further including cooling the low-pressure flow of fluid before the low-pressure flow of fluid is directed to either of the transmission or the output transfer group.

16. The method of claim 15, further including filtering the high-pressure flow of fluid before the high-pressure flow of fluid is directed to either of the transmission or the output transfer group.

17. The method of claim 13, further including: selectively relieving fluid from the low-pressure flow of fluid to the transmission sump before the low-pressure flow of fluid is cooled; and selectively relieving fluid from the high-pressure flow of fluid to the transmission sump before the high-pressure flow of fluid is filtered.

18. The method of claim 17, further including restricting a portion of the low-pressure flow of fluid being directed to the output transfer group.

19. A mobile machine, comprising:
a frame;
a front axle rotatably supporting a front end of the frame;
tandem rear axles rotatably supporting a rear end of the frame;
an engine;
a transmission connected to the engine;
an output transfer group operatively connecting the transmission to the front and tandem rear axles; and
a hydraulic circuit configured to supply the transmission and the output transfer group with high- and low-pressure flows of fluid, the hydraulic circuit including:
a first sump disposed within a transmission housing and configured to collect fluid drained from the transmission;
a second sump, disposed within an output transfer group housing that is spaced from and independent of the transmission housing, configured to collect fluid drained from the output transfer group;
an internal transmission pump positioned inside the transmission and configured to draw fluid from the first sump and generate the high- and low-pressure flows of fluid;
a scavenge pump driven by the engine to transfer fluid from the second sump into the first sump;
a single cooler configured to cool the low-pressure flow of fluid before the low-pressure flow of fluid is directed to either of the transmission or the output transfer group;
a single filter configured to filter the high-pressure flow of fluid before the high-pressure flow of fluid is directed to either of the transmission or the output transfer group;
a single low-pressure relief valve associated with the internal transmission pump;
a single high-pressure relief valve located downstream of the single filter; and
a restrictive orifice located downstream of the single cooler and configured to divert a majority of the low-pressure flow of fluid to the transmission.

* * * * *